United States Patent Office 3,346,617
Patented Oct. 10, 1967

3,346,617
METHOD FOR PREPARING
METHACRYLONITRILE
Kenzo Hiroki, Urawa-shi, Tashichika Shizume, Yokohama, Yutaka Nakamura, Musashino-shi, and Tokachika Yoshino, Hiroyoshi Kamio, Sozaburo Irie, and Yuichi Kawamura, Yokohama, Japan, assignors to Nitto Chemical Industry Co., Ltd., Tokyo, Japan
Filed Feb. 16, 1965, Ser. No. 436,990
Claims priority, application Japan, July 11, 1961, 36/24,069, 36/24,070; Dec. 22, 1961, 36/46,321
10 Claims. (Cl. 260—465.3)

This application is a continuation-in-part of our United States patent applications, Ser. No. 203,452, filed June 19, 1962, Ser. No. 203,453, filed June 19, 1962, and Ser. No. 203,572, filed June 19, 1962, all of which are now abandoned.

This invention relates to a method of production of methacrylonitrile, and more particularly to a method of production of methacrylonitrile by gas-phase catalytic reaction of isobutylene with molecular oxygen and ammonia, with a yield of at least 40%. This invention is also concerned with the synthesis of methacrylamide and methacrylates from methacrylonitrile produced in this manner from isobutylene.

It is well known that an unsaturated nitrile is obtained by passing a gas containing olefins, oxygen and ammonia over a solid catalyst at an appropriate temperature. However, the yield of unsaturated nitrile by means of this method is too low for an industrial process. A method has been proposed recently in U.S. Patent No. 2,904,580 in which the above-mentioned process is carried out employing a catalyst of the molybdate, phospho-molybdate, and phosphotungstate of at least one metal selected from bismuth, tin, and antimony, bismuth phospho-molybdate being preferable. Although a satisfactory yield is obtained when this catalyst is used for the syntheses of acrylonitrile from propylene, the conversion of isobutylene to methacrylonitrile using a bismuth phospho - molybdate catalyst is unsatisfactory, the conversion yield being quite low, of the order of 10% or less. Further, in the conversion of isobutylene to methacrylonitrile using the bismuth phospho-molybdate catalyst the actual yield of useful products, including acetonitrile is only about 30%; and the actual yield of methacrylonitrile from isobutylene is still lower.

These facts indicate that the production of an unsaturated nitrile from an olefin apparently depends on the particular olefin and the activity of a catalyst with respect to the conversion of olefin to unsaturated nitrile varies depending on the structure of the olefin. It is not at all unusual that reactions known to be practical for a specific olefin cannot be satisfactorily applied to other olefins. For instance, the gas-phase oxidation of ethylene in the presence of a silver catalyst is a well-known commercial process, but the production of propylene oxide by the same method in good yield is very difficult. Thus, even though the catalytic conversion of proplylene to acrylonitrile by gas-phase ammoxidation has been accomplished in more than 50% yield, the behavior of propylene and of isobutylene are different in the gas-phase, catalytic ammoxidation reaction, and it has been difficult to prepare methacrylonitrile in a good yield from isobutylene. No satisfactory results are obtained in production of methacrylonitrile from isobutylene by merely following the method of the acrylonitrile production from propylene.

It is an object of this invention to provide a catalyst particularly suitable for converting isobutylene by reaction in the gas-phase with oxygen and ammonia to methacrylonitrile.

It is another object of this invention to provide a method of producing methacrylonitrile from isobutylene in at least 40% yield.

It is a further object of this invention to prepare methacrylamide and methacrylates in economical yield from the methacrylonitrile produced by the catalytic, gas-phase ammoxidation of isobutylene.

These and other objects will become apparent from the following detailed description of the invention.

Improvement in both the percent conversion of isobutylene and percent yield of methacrylonitrile in the gas-phase ammoxidation of isobutylene have been found when the composition of a specified bismuth phospho-molybdate catalyst employed for the ammoxidation is made "more alkaline," either by the addition to the bismuth phospho-molybdate catalyst of an alkali metal or alkaline earth metal, or by the substitution of arsenic and/or antimony for a part or all of phosphorous in the phospho-molybdate composition, or further by the addition to the substituted molybdate of an oxide or hydroxide of an alkali or alkaline earth metal. The bismuth phospho-molybdate catalysts referred to include compositions expressed by the empirical formula: $Bi_{6-12}P_{0.5-5}Mo_{12}O_{46-61}$. The atomic ratio of the molybdenum to the alkali and/or alkaline earth metal to be added may range preferably 1–5 to 12 and most preferably 1–2 to 12.

Methacrylonitrile is produced in good yield, according to one aspect of the present invention by contacting a mixture containing isobutylene, molecular oxygen and ammonia in the gas-phase with a catalyst having the empirical formula: $P_nMO_{12}Bi_dX_eY_fO_g$, wherein X is selected from the group consisting of arsenic and antimony and Y is selected from the group consisting of alkali metals and alkaline earth metals, and $n=0-5$, $d=6-12$, $e=0.5-5$, $f=0.5$, and at least 1, when $e=0$, $g=46-61$ and $n+e=0.5-5$.

Among the preferred catalysts which have the empirical Formula $P_nMo_{12}Bi_dX_eY_fO_g$ as just defined are oxides having the elemental compositions in atomic ratios as follows: $Bi_9PMo_{12}CaO_{53}$, $Bi_9As_{1.5}Mo_{12}Na_2O_{53}$, $$Bi_9As_{1.5}Mo_{12}O_{52}$$

and $Bi_9PSb_2Mo_{12}O_{55}$.

It has been further discovered that catalysts which are oxides of the quaternary system of P–Sb–Mo–Bi and of the ternary system of Sb–Mo–Bi are particularly effective for catalyzing the gas-phase ammoxidation of isobutylene to methacrylonitrile when the elements phosphorus, antimony, molybdenum, and bismuth, or the elements antimony, molybdenum, and bismuth are all present, in particular atomic ratios in the catalyst. Methacrylonitrile is produced in yields of 40% or more by the gas-phase ammoxidation of isobutylene in the presence of a catalyst which is an oxide of the element components in atomic ratios expressed by the empirical formula:

$$P_nSb_aMo_bBi_cO_d$$

where
$n=0-12$
$a=0.5-20$
$b=1-18$
$c=0.5-11$ and $c \leq 4.4+b$
$a+b+c=22$
$d=\frac{5}{2}n+\frac{5}{2}a+3b+\frac{3}{2}c$ Generally speaking, an oxygen content or oxygen ratios of a given catalyst useful for an oxidation and/or an ammoxidation reactions would be variable during the reaction period. Accordingly it seems to us that it is difficult to define the accurate average value concerning the oxygen content or oxygen ratios of such an oxidation catalyst during the reaction period.

In all of the empirical formulas of catalysts referred to in the present invention, the particular oxygen ratios of each catalyst are defined to satisfy the normal valencies of the catalyst elements other than oxygen when they exist in the catalyst which is in a fully oxidized state produced immediately after either a preparation or a regeneration-by-aeration thereof.

In the drawings, FIGURES 1 and 2 relate to the ternary system Sb–Mo–Bi drawn on a triangular coordinate where the total number of atoms of antimony, molybdenum, and bismuth, ($a+b+c$ in the above formula) is 22.

Figure 1:
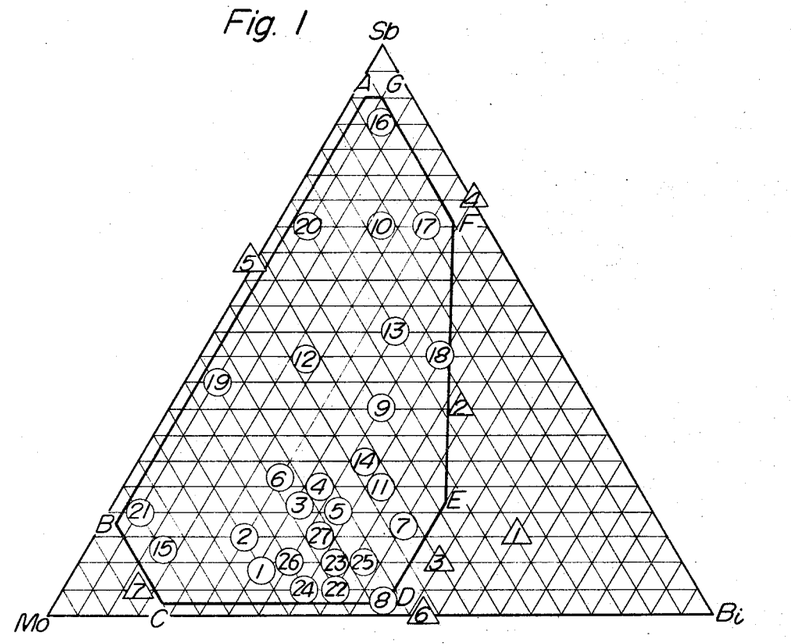

FIGURE 1 shows the scope of the ratios of the elemental components of the ternary system Sb–Mo–Bi of the catalysts of the present invention which, as will be further discussed are contained in the interior area surrounded by the scalene heptagon ABCDEFG. The ratios of Sb, Mo, and Bi of the quaternary oxide catalysts P–Sb–Mo–Bi employed in the examples illustrating the present invention where $P=1$ are shown on FIGURE 1 as circles (○); the number inside the circle is the particular example number. (Thus the point (①) defines the atomic ratios of Sb, Mo and Bi in the catalyst employed in Example 1.) The ratios of Sb, Mo and Bi, where $P=1$ of oxide catalysts employed as "Contrasts," are shown on FIGURE 1 as triangles (△), and the number inside the triangle is the contrast number. The Contrasts illustrate ammoxidation carried out in the manner of the present invention except that in each Contrast the catalyst employed is not a catalyst of the instant invention, that is, catalysts having Sb–Mo–Bi, ratios which are excluded from the present invention have been employed in ammoxidations and set forth herein as Contrasts. This has been done in order to contrast the results of isobutylene ammoxidation in the presence of catalysts of the instant invention with the results of said ammoxidation in the presence of catalysts which are closely related but excluded from the present invention.

Figure 2:
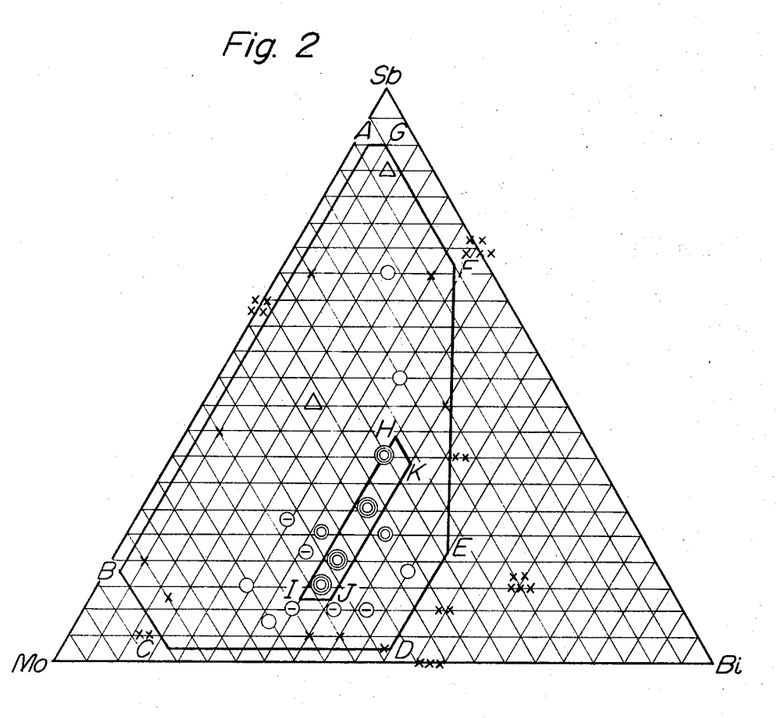

In FIGURE 2, the ratios of the elements Sb, Mo and Bi, where $P=1$, of the oxide catalysts used in the illustrative examples of the present invention and in the Contrasts have plotted on triangular coordinates using symbols to represent the percent conversion to methacrylonitrile, so that the relationship between the activity of the catalyst and the ratio of the elements Sb–Mo–Bi can be seen clearly. The symbols employed in FIGURE 2 represent the following conversion to methacrylonitrile
◎=70–65%, ⊙=65–60%, ⊕=60–55%, ○=55–50%, △=50–45%, ×=45–40%, ××=40–30%, ×××=30–20%, ××××=20–10%, ×××××=less than 10%.

The correlations of Sb, Bi and Mo, which have been discovered to be required for an effective isobutylene ammoxidation catalyst can also be explained by reference to the figures. In FIGURE 1, the lines $\overline{AG}$, $\overline{CD}$, $\overline{BC}$, $\overline{GF}$, $\overline{AB}$, $\overline{DE}$, and $\overline{EF}$ are drawn to indicate the atomic ratios of Sb, Bi and Mo in the quaternary oxide catalyst P–Sb–Bi–Mo, where $P=1$, wherein the catalyst is of such activity that methacrylonitrile is produced in a yield of 40% or more from isobutylene in the presence thereof. Thus in the empirical Formula $P_nSb_aMo_bBi_cO_d$, where $n=1$, $a+b+c=22$, and $d=\frac{5}{2}n+\frac{5}{2}a+3b+\frac{3}{2}c$, the lines $\overline{AG}$, $\overline{DC}$, $\overline{BC}$, $\overline{GF}$, $\overline{AB}$, $\overline{DE}$, show that $a=20$–0.5, $b=18$–1, $c=0.5$–11 respectively and the line $\overline{EF}$ shows that $c=4.4+b$, and therefore the elemental ratio of Sb–Mo–Bi of the ammoxidation catalyst covers the whole interior area surrounded by the scalene heptagon

ABCDEFG

In the series of examples plotted on the figures, the range of ratios of Sb, Mo and Bi is independent of the value of P. Examples of the catalyst wherein the value of P is varied are described in Table 3 which will be discussed below.

The most preferred range for the ratio of Sb, Mo and Bi in the ammoxidation catalyst can be seen clearly by reference to FIGURE 2; the area surrounded by the trapezoid H.I.J.K. corresponds to a catalyst composition having such activity that in its presence 65% or more conversion of isobutylene to methacrylonitrile is obtained. Thus, when $a+b+c=22$, the preferred ratio of Sb–Mo–Bi in the empirical formula $P_nSb_aMo_bBi_cO_d$ is $a=2.3$–8.9, $b=6.2$–12.8 and $c=6.9$–7.9. As the values of $a$, $b$ and $c$ increase or decrease from these values, the activity of the catalyst changes so that the conversion of isobutylene to methacrylonitrile is lowered. In particular, the gradient from $\overline{JK}$ to $\overline{DE}$ is considerably steep. As is clear from FIGURE 2, the upper limit of the ratio of Bi in the ternary system Sb–Mo–Bi should be strictly confined in order that the conversion to methacrylonitrile reach at least 40%. That is, as shown by $\overline{DE}$ the number of atoms of Bi in the catalyst should not exceed the sum of the number of atoms of Mo and Sb, and also the number of atoms of Bi should not exceed the sum of the number of atoms of Mo and one fifth of the sum of the number of atoms of (Sb–Mo–Bi) as shown by $\overline{EF}$.

The symbol ××× which is plotted on the base of the triangle (the side Mo–Bi) in FIGURE 2 comes under the composition of bismuth phospho-molybdate $$(PMo_{12}Bi_9O_{52})$$

which is supposed to be one of the most useful catalysts for synthesizing acrylonitrile from propylene. But, when the catalyst is employed for the synthesis of methacrylonitrile from isobutylene, the conversion to methacrylonitrile as determined by the experiments of the present inventors and set forth in Contrast 6 is only 22% and the yield is 29%. Also, the symbol ×××× plotted on the Sb–Mo side indicates the conversion to methacrylonitrile using an antimony phosphomolybdate ($PSb_{13.5}Mo_{8.5}O_{48.4}$) catalyst as illustrated by Contrast 5. Further, the symbol ××××× plotted on the Bi–Sb side indicates the conversion to methacrylonitrile where an oxide of $PSb_{16}Bi_6$ is employed as catalyst, conversion being exactly zero as described in Contrast 4. Surprisingly, not only are the presence of each of the elements Sb, Mo and Bi and to a certain degree P important to the activity of the catalyst for the ammoxidation of isobutylene, but also the particular atomic ratios of these elements in the catalyst strongly affect its activity. Thus it has been discovered that particular oxide catalysts containing Sb, Mo and Bi or containing P, Sb, Mo and Bi, in a specified range of atomic ratios are outstanding for the ammoxidation of isobutylene.

The present invention which is derived from the discoveries discussed above is a method for the production of methacrylonitrile which comprises contacting a mixture containing isobutylene, molecular oxygen and ammonia in the gas-phase with a catalyst which consists of oxides of the ternary system Sb–Mo–Bi or of the quaternary system P–Sb–Mo–Bi, wherein the atomic ratios of P, Sb, Mo and Bi are expressed by the empirical formula $P_nSb_aMo_bBi_cO_d$
where $n=0$–12
$a=0.5$–20
$b=1$–18
$c=0.5$–11, and $c \leq 4.4+b$
$a+b+c=22$
$d=\frac{5}{2}n+\frac{5}{2}a+3b+\frac{3}{2}c$ A preferred embodiment of the present invention for the production of methacrylonitrile as just defined is the employment of a catalyst which consists essentially of oxides of the element components in atomic ratios expressed by the empirical formula $P_nSb_aMo_bBi_cO_d$ where $n=0$–12, $a=2.3$–8.9, $b=6.2$–12.8, $c=6.9$–7.9, $a+b+c=22$ and $d=\frac{5}{2}n+\frac{5}{2}a+3b+\frac{3}{2}c$ With respect to the atomic ratio of phosphorous in the catalyst, in general, the most preferable atomic ratio of P in the formula $P_nSb_aMo_bBi_cO_d$ is 0.5 to 1.5, and changes from this range result to some degree in a lower conversion to, and yield of methacrylonitrile. The degree of lowering varies depending on the atomic ratio Sb–Mo–Bi, therefore the atomic ratio of P cannot be discussed unconditionally. However, generally the degree of decreased conversion to methacrylonitrile which results from a change in the ratio of P from 0.5–1.5 becomes prominent as the ratio of Sb increases. Therefore when the ratio of Sb is equal to, or greater than half the sum of the total number of atoms in the ternary system, Sb–Mo–Bi, it is preferable to have phosphorous in the catalyst, and thus, in the formula $P_nSb_aMo_bBi_cO_d$, when $a+b+c=22$, and $a=11$, the ratio of P is preferably kept within a value of 0.5 to 2, or $2 \geq n \geq 0.5$.

For the preparation of the catalyst any conventional method can be used, a preferred method comprises adding P, Sb, Mo and Bi in the form of phosphoric acid, antimony trioxide, molybdenum oxide or ammonium phosphomolybdate and bismuth nitrate, respectively, as starting materials to a carrier material with an appropriate quantity of water, mixing, drying and calcining the resultant mixture at a temperature between 400° and 550° C. A substance which contains mainly $SiO_2$, such as diatomaceous earth or silica, is a preferred carried material. It is possible that some of the components of the aforementioned catalyst combine chemically with the silica in the carrier material, therefore in a strict sense of the word silica may not be called "carrier" but, as this is not a substantial problem in this invention, silicia will be called "carrier" hereinafter. If desired, alumina may be used, as a "carrier" with the catalyst composition of the invention. In such a case, alumina calcined at an elevated temperature of 900°–1400° C. may be preferably used.

When carrying out the ammoxidation, any material may be used as oxygen source; air is favorably employed for reasons of economy. The isobutylene starting material is not required to be highly pure and may contain saturated hydrocarbons such as propane or butane. These hydrocarbons are substantially inactive in the reaction zone. The ammonia used may be of the quality suitable for fertilizers.

Preferable reaction temperatures fall in the range between 400° to 500° C., most preferably between 430° and 470° C., and the preferable contact time is between 2 and 12 seconds, most preferably between 4 and 10 seconds. Here the contact time is obtained in conjunction with the reaction temperature, thus for instance a contact of 7 seconds at 450° C. is equivalent to the space velocity of about 190 per hour by volume. In order to obtain a high conversion with a one pass reaction, introduction of additional air (or oxygen) is recommended as secondary air (or oxygen).

The molar ratio of oxygen/isobutylene in the reaction gas prior to the contact with the catalyst is preferably from 1.6 to 2.1. If the introduction of the additional air or oxygen is preferable, it is desirably introduced at a position of $\frac{2}{7}$ to $\frac{4}{7}$ of the reaction zone. The additional air (or oxygen) will be called the secondary air (or oxygen) in some part of the specification. The molar ratio of ammonia/isobutylene is preferably from 0.8 to 1.5. The existence of water in the reaction gas is effective for avoiding the deposit of carbon and the decomposition of ammonia by combustion. The molar ratio of water/isobutylene is most preferably between 0.5 and 3.0, but it may be from 0.5 to 1.0 when the most suitable composition of the catalyst in the claims of the present invention is employed.

The reaction may be carried out in the form of fixed bed or fluidized bed, however, as the reaction is greatly exothermic, careful attention should be paid to removal of the heat of reaction if a fixed bed is employed. For this purpose the diameter of the reaction pipe may be reduced as much as possible, or the addition of some suitable diluents to the catalyst such as Raschig rings made of porcelain or iron is recommended.

The definitions of terms "conversion" and "yield" of the product based on the amount of isobutylene are as follows:

Conversion (per cent)
$$= \frac{\text{Carbon weight in the product}}{\text{Carbon weight in the isobutylene supplied}} \times 100$$

Yield (per cent)
$$= \frac{\text{Carbon weight in the product}}{\text{Carbon weight in the isobutylene reacted}} \times 100$$

Processes have been proposed for preparing methacrylic acid and methacrylate esters from isobutylene such as the process wherein isobutylene is oxidized in a gas-phase to form methacrolein, then the methacrolein is oxidized in the liquid phase to obtain methacrylic acid, and the methacrylic acid, thus obtained is then esterified. This process is expressed by the following equations:

Another proposed process involves the oxidation of isobutylene in the liquid phase by means of nitric acid and oxides of nitrogen to form α-hydroxyisobutyric acid and may be expressed by equations as follows:

However, there has been no suggestion of a method for producing methacrylate ester from methacrylonitrile, nor has there been a suggestion or disclosure for preparing a methacrylate ester from methacrylonitrile on a commercial scale. At least one important reason that the preparation of methacrylates from methacrylonitrile has not been proposed is the difficulty and lack of success previously encountered in attempts to prepare methacrylonitrile by a single-step, economically practical process from isobutylene. Furthermore, no specific example has been reported regarding the syntheses of a methacrylate from methacrylonitrile, and also, upon superficial consideration it would appear that a method of preparing methacrylonitrile from isobutylene which uses an additional material, such as ammonia could not compete economically with a process where ammonia is not required, such as the above-described method via methacrolein.

Also, according to the present invention, methacrylonitrile formed by catalytic, gas-phase ammoxidation can be converted to methacrylamide by treatment with sulfuric acid, and reaction of methacrylamide with an alcohol results in the production of a methacrylate in a yield of 80% or more based on methacrylonitrile.

It has been found that in order to obtain methacrylamide and methacrylates in good yield from methacrylonitrile, it is preferably that the methacrylonitrile should contain less than 5% by weight of methacrolein. Separation of methacrylonitrile from the ammoxidation reaction mixture is accomplished by passing the reaction mixture through an absorbent suitable for absorbing methacrylonitrile. This step may be carried out according to any conventional method of which the most representative example may be the absorption in water. It is most preferable to effect a normal pressure absorption by use of water cooled to 2°–4° C. to obtain an aqueous solution of methacrylonitrile at a concentration of 0.8–1.5%. Organic solvents for methacrylonitrile such as aromatic hydrocarbons like benzene, toluene or xylene can be used also as the absorbent. On employing a suitably designed absorber, 90–99% of methacrylonitrile is absorbed under the above conditions. By-products of the ammoxidation contained in the effluent gas which are liquids at normal temperatures, such as methacrolein, acetonitrile and hydrocyanic acid, are absorbed at the same time. These materials are separated in the succeeding step by distillation.

When water is used as the absorbent, the resulting aqueous solution containing methacrylonitrile is stripped, whereupon an azeotrope of methacrylonitrile and water is distilled, yielding a distillate which separates into two layers. The stripping tower is kept at 99°–100° C. at the bottom, and the azeotrope is taken out from the top (azeotropic point 770 C.). The upper layer consists mainly of methacrylonitrile and also contains water, hydrocyanic acid, acetonitrile and methacrolein as impurities. Usually methacrylonitrile prepared in this way contains less than 5% methacrolein and may be sent to the succeeding amidation step without any further operation. However, if it is necessary, or considered desirable to reduce the amount of methacrolein or if the recovery of hydrocyanic acid and methacrolein which are useful by-products is desired, the separation of these materials from methacrylonitrile may be preferred.

Hydrocyanic acid, water, and methacrolein may be separated from methacrylonitrile by the following procedure. Hyrocyanic acid is distilled by treating the upper layer of the distillate in a topping tower kept at 90° C. at the bottom and at 23°–26° C. at the top, where said acid coming out from the top is recovered by an appropriate method. The resulting methacrylonitrile substantially free of low boiling substances is then treated in a dehydration-distillation tower. Here, an azeotrope of methacrolein and water distills from the top (azeotropic point 62° C.), this azeotrope also contains hydrocyanic acid which was not removed in the topping tower. From the middle of the dehydration tower a mixture consisting of an azeotrope of acetonitrile and water (azeotropic point 76.1° C.) and an azeotrope of methacrylonitrile and water (azeotropic point 77° C.) is obtained. Since the mixture-distillate separates into two layers, the water layer is return to the topping tower, and the organic layer is refluxed. Thus, a mixture is obtained which consists of a large amount of methacrylonitrile and a small amount of acetonitrile and contains substantially no water.

In order to recover methacrylonitrile this mixture is distilled in a first rectifying column where acetonitrile is distilled off from the top. Methacrylonitrile is thus obtained from the bottom which contains only trace impurities such as high boiling substances. If further purification is required this methacrylonitrile may be distilled in a second rectifying column whereby pure methacrylonitrile is obtained from the top.

The above description is only one example of a desirable method of obtaining methacrylonitrile of high purity. Other methods can of course be employed for the purification.

Methacrolein forms an addition compound, methacrolein-cyanohydrine with hydrocyanic acid, but the addition compound is decomposed during the distillation, whereafter this addition-decomposition reaction is repeated. For this reason methacrolein cannot be removed by distillation of the crude product containing hydrocyanic acid. However, the methacrolein-cyanohydrine addition compound can be stabilized by the addition of a small quantity of sulfuric acid to the mixture before distillation so that it is not decomposed into methacrolein and hydrocyanic acid during distillation and thereby remains in the bottom undistilled. Methacrolein can be removed completely by treating the solution from the topping tower with chemicals such as hydroxylamine or sodium sulfite with caustic soda.

While it is not absolutely necessary that the methacrylonitrile used for the preparation of methacrylamide and methacrylate esters be a purified product, it is difficult to recover the hydrocyanic acid and acetonitrile contained in the methacrylonitrile, after these conversions. Also if the methacrylonitrile contains a large quantity of methacrolein, the subsequent yield of methacrylate is decreased somewhat and a complicated process may be required in order to purify the resulting methacrylate ester. Therefore, it is desirable that the content of methacrolein be as low as possible, and the use of methacrylonitrile containing less than 5 percent, preferably less than 2.5 percent, of methacrolein based on the amount of methacrylonitrile is advantageous. Methacrylonitrile is hydrolyzed to methacrylamide in liquid-phase with sulfuric acid at a concentration of the order of 50% to 95%, and preferably at a concentration of 70–90% by treatment of methacrylamide with the appropriate alcohol. Esterification with lower-alkyl alcohols such as methyl, ethyl, propyl and butyl alcohols is carried out by heating methacrylamide together with an excess of the lower-alkyl alcohol to form the corresponding, lower-alkyl methacrylate. The esterification can be carried out by addition of the alcohol directly to the amidification reaction mixture.

Methyl methacrylate is prepared by treatment of methacrylamide with 1.5 to 3 moles of methanol and 0–1 mole of water per mole of methacrylamide at a temperature of 80° C. to 120° C., preferably 90°–100° C. The reaction is complete in about 1 to 2 hrs.

A preferred method whereby still higher yield of methyl methacrylate is obtained involves dividing the total quantity of methanol to be used for the esterification into two portions. As a first portion about ⅔–¾ to the total amount of methanol is added initially to the reaction mixture, a major portion of the methyl methacrylate thus formed is removed by distillation, and then the remainder of the methanol is added to the reaction and the esterification is continued. Methyl methacrylate is obtained in this way in yield of 90% or more. Better results are obtained if water containing methanol of 85–90 percent strength is used in said method. Ethyl ester can be prepared by a similar method as illustrated by Example 60.

The methyl methacrylate distillate thus obtained contains excess methanol, and other impurities such as a small amount of ether. Pure methyl methacrylate is obtained by washing the distillate with water or brine, and then distilling the ester layer under reduced pressure, from the water layer, methanol and the dissolved methyl methacrylate are recovered by distillation. The residue of the steam distillation can be put into ammonium sulfate saturation bath to recover ammonium sulfate, after the filtration of resinous matters.

Although the processes have been described as batch process they can, of course be carried out continuously.

The following examples of the invention are presented for purposes of illustration only and are not to be construed as limiting the invention. The contrasts set forth the results wherein ammoxidation is carried out with a catalyst not included in the catalyst compositions of the instant invention and are presented for purposes of comparison. "Parts" set forth in catalyst preparations means "parts by weight."

AMMOXIDATION REACTIONS

Examples 1–27.—Experimental conditions

One hundred and thirty cubic centimeter of a catalyst was filled in reaction vessel, which is made of steel pipe with an approximate inner diameter of 27.6 mm. and approximate external diameter of 34.0 mm. and known as 1 inch gas pipe, with a heating zone of about 500 mm. in length. The reaction vessel was brought to the required temperature by heating in nitre containing equal quantities by weight of potassium nitrate and sodium nitrite (to about 450° C.).

The reaction gas prior to the contact with the catalyst contained following components.

| Components: | Mole percent |
|---|---|
| Isobutylene | 7 |
| Ammonia | 9 |
| Air | 70 |
| Steam | 14 |

The reaction gas of said components was passed through the reaction vessel at a flow rate of 30 l. per hour. When the reaction gas had passed two-sevenths of the catalyst layer the secondary air was introduced at a flow rate of 7 l. per hour.

Catalyst 564 parts of silica sol (10%), 2.2 parts of 85% phosphoric acid, 4.2 parts of antimony trioxide, 46.5 parts of ammonium phospho-molybdate, 59.6 parts of bismuth nitrate were mixed well and after drying by heating and calcining made into pellets of about 4 mm. $\phi$ x 4 mm. h. The resultant catalyst consisted of oxides of the five components P–Sb–Mo–Bi–Si and which empirical formula was $P-Sb_{1.5}-Mo_{14}-Bi_{6.5}-O_{56.5}-(SiO_2)_{50}$. "$(SiO_2)_{50}$" means carrier of the catalyst. The catalyst was employed in Example 1.

The catalysts employed in Examples 2–27 were made as in Example 1 but varying the ratio of atoms in the ternary system Sb–Mo–Bi (the values for P and Si were unchanged).

The empirical formula of the catalysts in Examples 2–27 will be calculated from the atomic ratio in the ternary system Sb, Mo and Bi shown in Table 1, for instance, the empirical formula of Example 9 is represented by $P-Sb_8-Mo_7-Bi_7-O_{46}-(SiO_2)_{50}$, because the values for P and Si (accordingly $SiO_2$) are the same as those of Example 1, and the values for Sb, Mo and Bi are read to be 8, 7 and 7 respectively from Table 1, and the values for oxygen is calculated from the definition "$d = \frac{5}{2}n + \frac{3}{2}a + 3b + \frac{3}{2}c$"

in view of $n=1$, $a=8$, $b=7$ and $c=7$ (note $a+b+c=22$).

Results

The results of Examples 1–27 are summarized in Table 1. And the correlations of the results are shown graphically in FIGURE 1 wherein the number of the example is shown in the circle, and in FIGURE 2 wherein the percent conversion to methacrylonitrile is shown by a symbol.

Contrasts 1–7

Experimental conditions and the method for preparing catalysts are the same as Examples 1–27. However, the atomic ratio of the elements in the ternary system Sb–Mo–Bi of the catalysts employed in these ammoxidations are outside of the range expressed by the empirical formula $P_nSb_aMo_bBi_cO_d$ where $n=0-12$, $a=0.5-20$, $b=1-18$, $c \leq 4.4+b$, $a+b+c=22$ and $d=\frac{5}{2}n+\frac{3}{2}a+3b+\frac{3}{2}c$. The values for Si and P are the same as Examples 1–27.

The results of the Contrasts 1–7 are summarized in Table 2. And the correlations of the results are shown graphically in FIGURE 1 where the contrast number is shown in the triangle, and in FIGURE 2, where the percent conversion to methacrylonitrile is shown by a symbol. In the Contrasts there is no experiment in which the conversion to methacrylonitrile reaches 35 percent and, there is no instance in which the yield of methacrylonitrile reaches 40 percent.

Examples 28–32

The experiments were carried out as in Example 1 and the catalyst also prepared as in Example 1 except that the amount of phosphoric acid had been changed. The results are indicated in Table 3 together with the results of Examples 33–39.

Examples 33–36

The experiments were carried out as in Example 9 and the catalyst prepared as in Example 9 except that the amount of phosphoric acid had been changed. The results are indicated in Table 3.

Examples 37–39

The experiments were carried out as in Example 23, with the catalyst prepared as in Example 23 except that the amount of phosphoric acid was changed. The results are indicated in Table 3.

Examples 40–42

The experiments were carried out as in Example 14, with the catalyst $(PSb_6Mo_{8.5}Bi_{7.5}O_{48.3})$ prepared as in Example 14 except that the concentration of silica as "carrier" was changed. The conversions to methacrylonitrile are set forth in Table 4.

Example 43

The experiment was carried out as in Example 14 with the catalyst of Example 14 except that the experimental conditions were changed as follows:

(1) In reaction gas prior to the contact with the catalyst, the content of isobutylene was reduced to 6.5 percent from 7.0 percent. The content of ammonia was increased to 9.5 percent.
(2) The amount of the secondary air, was increased to 14 l. per hour from 7 l. per hour.
(3) The amount of the catalyst was increased so that 70 cc. more of the catalyst was added.

The conversion to methacrylonitrile was 68 percent with the production of methacrolein of 1–2 percent.

Example 44

Example 43 was followed except that the reaction temperature was reduced to 430° C. The conversion to methacrylonitrile stayed almost unchanged (68–69 percent).

Examples 45–46

The molar ratio of water/isobutylene is about 2.1 in Example 43. The experiments were carried out as in Example 43 except that this ratio was changed. The results were as follows:

| Examples | Molar ratio of water/ isobutylene | Conversion to methacrylonitrile, percent |
|---|---|---|
| 45 | 1.0 | 66 |
| 46 | 0.5 | 62 |

Examples 47–48

The experiments of Examples 45 and 46 were repeated except that the reaction temperature was reduced to 430° C. from 450° C. The results were almost the same as said examples.

TABLE 1

| Ex. No. | Atomic ratio in the ternary system | | | Conversion, percent | | | Yield of Methacrylonitrile |
|---|---|---|---|---|---|---|---|
| | Sb | Mo | Bi | Methacrylonitrile | Methacrolein | Hydrocyanic acid | |
| 1 | 1.5 | 14.0 | 6.5 | 53 | 4 | 2 | 63 |
| 2 | 3.0 | 14.0 | 5.0 | 53 | 4 | 1 | 55 |
| 3 | 4.0 | 11.5 | 6.5 | 58 | 6 | 1 | 64 |
| 4 | 5.0 | 10.5 | 6.5 | 63 | 6 | 1 | 65 |
| 5 | 4.0 | 10.5 | 7.5 | 66 | 4 | 2 | 63 |
| 6 | 5.5 | 11.5 | 5.0 | 56 | 10 | 1 | 58 |
| 7 | 3.5 | 8.5 | 10.0 | 52 | 3 | 3 | 56 |
| 8 | 0.5 | 10.5 | 11.0 | 40 | 2 | 1 | 50 |
| 9 | 8.0 | 7.0 | 7.0 | 65 | 5 | 1 | 70 |
| 10 | 15.0 | 3.5 | 3.5 | 55 | 11 | 1 | 60 |
| 11 | 5.0 | 8.5 | 8.5 | 64 | 2 | 2 | 67 |
| 12 | 10.0 | 8.5 | 3.5 | 49 | 18 | 0.4 | 56 |
| 13 | 11.0 | 5.0 | 6.0 | 54 | 12 | 0.5 | 64 |
| 14 | 6.0 | 8.5 | 7.5 | 65 | 6 | 1 | 68 |
| 15 | 2.5 | 17.0 | 2.5 | 42 | 6 | 5 | 49 |
| 16 | 19.0 | 1.5 | 1.5 | 45 | 8 | 2 | 59 |
| 17 | 15.0 | 2.0 | 5.0 | 44 | 4 | 3 | 58 |
| 18 | 10.0 | 4.0 | 8.0 | 41 | 3 | 2 | 52 |
| 19 | 9.0 | 12.0 | 1.0 | 42 | 8 | 3 | 55 |
| 20 | 6.0 | 15.0 | 1.0 | 41 | 6 | 2 | 54 |
| 21 | 4.0 | 17.0 | 1.0 | 43 | 7 | 4 | 57 |
| 22 | 1.0 | 12.0 | 9.0 | 41 | 5 | 1 | 57 |
| 23 | 2.0 | 11.5 | 8.5 | 59 | 3 | 3 | 65 |
| 24 | 1.0 | 13.0 | 8.0 | 42 | 6 | 1 | 54 |
| 25 | 2.0 | 10.5 | 9.5 | 57 | 4 | 3 | 65 |
| 26 | 2.0 | 13.0 | 7.0 | 59 | 3 | 2 | 63 |
| 27 | 3.0 | 11.5 | 7.5 | 67 | 4 | 2 | 68 |

TABLE 2

| Contrast No. | Atomic ratio in the ternary system | | | Conversion, percent | | | Yield of Methacrylonitrile |
|---|---|---|---|---|---|---|---|
| | Sb | Mo | Bi | Methacrylonitrile | Methacrolein | Hydrocyanic acid | |
| 1 | 3.0 | 5.0 | 14.0 | 0 | 1 | 1 | 0 |
| 2 | 8.0 | 4.5 | 9.5 | 21 | 4 | 2 | 28 |
| 3 | 2.0 | 8.0 | 12.0 | 32 | 4 | 2 | 37 |
| 4 | 16.0 | | 6.0 | 0 | 0.2 | 2 | 0 |
| 5 | 13.5 | 8.5 | | 16 | 25 | 2 | 22 |
| 6 | | 12.5 | 9.5 | 22 | 2 | 2 | 29 |
| 7 | 1.0 | 18.5 | 2.5 | 31 | 15 | 2 | 37 |

TABLE 3

| Ex. No. | Atomic ratio of catalyst | | | | Conversion, percent | | | Yield of Methacrylonitrile |
|---|---|---|---|---|---|---|---|---|
| | P | Sb | Mo | Bi | Methacrylonitrile | Methacrolein | Hydrocyanic acid | |
| 28 | 0 | 1.5 | 14.0 | 6.5 | 42 | 8 | 2 | 57 |
| 29 | 0.5 | 1.5 | 14.0 | 6.5 | 49 | 5 | 2 | 59 |
| 1 | 1 | 1.5 | 14.0 | 6.5 | 53 | 4 | 2 | 63 |
| 30 | 2 | 1.5 | 14.0 | 6.5 | 52 | 5 | 1 | 65 |
| 31 | 4 | 1.5 | 14.0 | 6.5 | 43 | 5 | 2 | 58 |
| 32 | 7 | 1.5 | 14.0 | 6.5 | 46 | 4 | 4 | 55 |
| 33 | 0 | 8.0 | 7.0 | 7.0 | 25 | 8 | 2 | 42 |
| 34 | 0.5 | 8.0 | 7.0 | 7.0 | 56 | 6 | 1 | 63 |
| 9 | 1 | 8.0 | 7.0 | 7.0 | 65 | 5 | 1 | 70 |
| 35 | 2 | 8.0 | 7.0 | 7.0 | 50 | 12 | 1 | 65 |
| 36 | 4 | 8.0 | 7.0 | 7.0 | 38 | 14 | 1 | 47 |
| 37 | 0 | 2.0 | 11.5 | 8.5 | 34 | 3 | 1 | 41 |
| 38 | 0.5 | 2.0 | 11.5 | 8.5 | 50 | 3 | 2 | 53 |
| 23 | 1 | 2.0 | 11.5 | 8.5 | 59 | 3 | 3 | 65 |
| 39 | 2 | 2.0 | 11.5 | 8.5 | 53 | 2 | 2 | 58 |

TABLE 4

| Example No. | Atomic ratio of catalyst | | | | Si/P atomic ratio | Conversion to methacrylonitrile, percent |
|---|---|---|---|---|---|---|
| | P | Sb | Mo | Bi | | |
| 40 | 1 | 6 | 8.5 | 7.5 | 29 | 63 |
| 14 | 1 | 6 | 8.5 | 7.5 | 50 | 65 |
| 41 | 1 | 6 | 8.5 | 7.5 | 65 | 62 |
| 42 | 1 | 6 | 8.5 | 7.5 | 80 | 55 |

Discussion of the results set forth in Tables 1–4

Examples 1–27, set forth in Table 1 have been carried out to show the correlation between the activity of a catalyst, as indicated by the percentage conversion of isobutylene and by the percentage yield of methacrylonitrile and the ratio of the atoms in the ternary system Sb–Mo–Bi. In all of these examples, $P_n$ has been kept constant at $P_n=P_1$, in the catalyst composition and all of the conditions of the ammoxidation reaction are the same.

Contrasts 1–7 set forth in Table 2 have been carried out in the presence of a catalyst having the same amount of P and Si as Examples 1–27, but having a different atomic ratio of the elements, Sb, Mo, and Bi. Except for said difference in the catalyst, all of the conditions under which the ammoxidation reactions were carried out are identical for both Examples 1–27 and Contrasts 1–7.

By comparison of the percentage conversion of isobutylene and percentage yield of methacrylonitrile resulting in Examples 1 to 27 with that of Contrasts 1–7 as set forth in Tables 1 and 2, respectively, it is obvious that the catalysts of the instant invention are significantly more active in promoting the ammoxidation than are closely related catalysts having an atomic ratio of Sb, Mo and Bi outside that of the present invention and which are excluded therefore from the instant invention, and that the activity of the catalyst is decreased significantly when any single component of the ternary system Sb-Mo-Bi is below that of formula $P_nSb_aMo_bBi_c$ as defined above.

In Table 3 the results of experiments are set forth wherein the ratio of phosphorus has been varied. It is clear that the best results are obtained when $P_n=P_1$, however, a satisfactory yield, of over 40% is obtained where $n$ is varied from 0 to 7.

It should be noted that as $n$ varies from 1, the by-production of methacrolein increases, and this tendency is particularly prominent in Examples 33–36 where the ratio of Sb is close to the upper limit.

The results set forth in Table 4 indicate that the percent of conversion to methacrylonitrile is essentially independent of the concentration of silica as "carrier."

*Ammoxidation in the presence of catalyst of the composition $P_nMo_{12}Bi_dX_eY_fO_g$, where X is Sb or As, Y is an alkali metal or alkaline earth metal, and $n=0-5$, $d=6-12$, $e=0.5-5$, $f=0-5$, and at least 1 when $e=0$, and $n+e=0.5-5$, and $g=46-61$.*

Example 49.—Preparation of the catalyst

The starting materials mentioned below were mixed in a mixer with a suitable amount of water to make a slurry the molybdate at 450° C. in an electric furnace for 4 hours.

Molybdenum oxide _______________________________ g__ 120
Bismuth nitrate __________________________________ g__ 304
Phosphoric acid (85%) __________________________ cc__ 4.8
Calcium oxide ___________________________________ g__ 3.9
Diatomaceous earth (carrier) ___________________ g__ 120

The thus-obtained slurry was transferred to a flat vat with smooth surface, gradually heated on a hot plate and dried. After cooling, the resultant solid was crushed and water was added thereto. This mixture was kneaded well in a high speed mixer and then formed into pellets of about 4 mm. φ x 4 mmh. The pellets were heated in an electric furnace at 540°+10° C. for three hours. The empirical formula of the catalyst was approximately $Bi_9PMo_{12}CaO_{53}$–$(SiO_2)_{29}$. "$(SiO_2)$" means carrier of the catalyst.

Two hundred cc. of the catalyst was filled in a reaction tube of the same size and type described for Example 1. The starting gas used for the reaction which had the same composition as described for example, was passed through the reaction vessel, at a flow rate of 80 l./hr. which is equivalent to the space velocity of 400 hr.$^{-1}$ by volume.
The conversions were as follows:

| | Percent |
|---|---|
| Methacrylonitrile | 33 |
| Methacrolein | 1 |
| Hydrocyanic acid | 1 |
| Acetonitrile | 2 |
| Carbon dioxide | 6 |
| Carbon monoxide | 2 |
| Unreacted isobutylene | 53 |
| Total | 98 |

The yield of methacrylonitrile based on the amount of the reacted isobutylene was 70%. Fifty-four percent of the ammonia supplied remained unreacted, and the total recovery of ammonia was 87%, so that the loss of ammonia by the decomposition caused by combustion was only 13%.

Example 50

A catalyst was produced as in Example 49, except that 10.35 g. of arsenious acid and 5.6 g. of caustic soda were employed in place of phosphoric acid and calcium oxide, respectively. The empirical formula of the catalyst was approximately $Bi_9As_{1.5}Mo_{12}Na_2O_{53}-(SiO_2)_{29}$.

The catalyst was charged into the same reaction tube as in Example 1, and the reaction was carried out at 450° C. (measured in the bath) and at a space velocity of 200 hr.$^{-1}$.

The starting gas had the following composition:

| Components: | Mole percent |
|---|---|
| Isobutylene | 7.7 |
| Ammonia | 10.3 |
| Air | 65 |
| Steam | 17 |

When the reaction gas had passed two-seventh of the catalyst layer, additional air was introduced at a flow rate of 20 l./hr. (the original air contained in the starting material was 26 l./hr.).

The conversions were as follows:

| | Percent |
|---|---|
| Methacrylonitrile | 54 |
| Methacrolein | 4 |
| Hydrocyanic acid | 4 |
| Acetonitrile | 5 |
| Carbon dioxide | 10 |
| Carbon monoxide | 5 |
| Unreacted isobutylene | 15 |
| Total | 97 |

The yield of methacrylonitrile based on the amount of the reacted isobutylene was 64%. Eight percent of the ammonia fed was unreacted, and the total recovery of ammonia was 68%.

Example 51

A catalyst of the empirical formula of $$Bi_9As_{1.5}Mo_{12}O_{52}-(SiO_2)_{29}$$

was produced as in Example 50 but without the addition of caustic soda. Using the catalyst, the procedures in Example 50 was repeated. The conversion to methacrylonitrile was 55%, and the conversion to methacrolein was 5%.

Example 52

Five hundred and sixty four parts of silica sol (10%), 40.7 parts of ammonium phosphomolybdate, 82.6 parts of bismuth nitrate, 2.6 parts of 85% phosphoric acid and 11.5 parts of antimony trioxide were mixed well and allowed to stand over night (said part shows part by weight). The resultant mixture was calcined, after 6 hours drying at 92° C., in an electric furnace kept at 540°+10° C. for 3 hours. The empirical formula of the catalyst was approximately $Bi_9PSb_2Mo_{12}O_{55}-(CiO_2)_{50}$. It was crushed and the resultant particles having the size of 100-200 meshes selected by screening were used for the reaction.

Reaction

Twenty eight hundred grams of the catalyst thus prepared (apparent specific gravity=1.0) was placed in a fluidized reaction vessel made of steel which was 1 m. in length and 130 mm. in inner diameter. Another 2,800 grams of the catalyst was placed similarly in another fluidized reaction vessel. The former was used as the first stage fluidized bed and the latter was used as the second stage fluidized bed.

The reaction gas of the following composition was introduced into the above mentioned fluidized reaction vessels:

| | Parts by volume |
|---|---|
| Air | 100 |
| Isobutylene | 10 |
| Ammonia | 12 |
| Steam | 20 |

The following results were obtained by the analysis of the effluent gas from the second stage fluidized be in order to determine the conversions based on the amount of isobutylene:

| | Percent |
|---|---|
| Methacrylonitrile | 56 |
| Methacrolein | 3 |
| Hydrocyanic acid | 2 |
| Acetonitrile | 3 |
| Carbon dioxide | 5 |
| Carbon monoxide | 1 |
| Unreacted isobutylene | 27 |
| Total | 97 |

The yield based on the amount of the isobutylene reacted was 77%. Of the ammonia supplied, 32% was unreacted, and the total recovery of ammonia was 94%.

Example 53

Example 52 was repeated except that air was introduced at a flow rate of 500 l. per hour as additional air, when the gas which had passed the first stage fluidized bed was introduced into the second stage fluidized bed. The conversions were as follows:

| | Percent |
|---|---|
| Methacrylonitrile | 67 |
| Methacrolein | 4 |
| Hydrocyanic acid | 3 |
| Acetonitrile | 3 |
| Carbon dioxide | 5 |
| Carbon monoxide | 1 |
| Unreacted isobutylene | 15 |
| Total | 98 |

The yield based on the amount of the isobutylene reacted was 79%. Of the ammonia supplied, 6% was unreacted, and the total recovery of ammonia was 91%.

It should be noted that the catalyst used Examples 52 and 53 is included in the formula $P_nSb_aMo_bBi_cO_d$.

Example 54.—Absorbing of methacrylonitrile from reacted gaseous mixture

The reacted gaseous mixture obtained in Example 53 after cooling to room temperature and condensing the excess water was introduced from the bottom of an absorbing tower which was 53 mm. in inner diameter and packed with Raschig rings of 5 mm. diameter, the height of the packing zone was 7 m. The flow rate of the introduced gas was about 1,300 l. per hour. Water which was kept within 2°-4° C. was charged from the top of the tower at a flow rate of 14 l./hr. Methacrylonitrile was absorbed in a yield of 97 percent. The concentration of the methacrylonitrile in the absorbent was 1 percent.

Since the condensed water contained a small amount of methacrylonitrile, it was sent to the subsequent separation step together with the absorption liquid.

*Example 55.—Separation of methacrylonitrile from absorption liquid*

A stripping tower (filled with McMahon packing) made of steel pipe which was 50 mm. in inner diameter and 3.0 m. in length, was used for the separation of methacrylonitrile from the absorption liquid of Example 54. The absorption liquid was fed at a flow rate of 8–10 l./hr. The stripping tower was kept at 99°–100° C. at the bottom and at 76°–90° C. at the top.

The concentration of methacrylonitrile retained in the still residue was only 0.015 percent. Namely, 98.5 percent of methacrylonitrile in the absorption liquid was recovered.

The organic layer of the distillate from the stripping tower was fed into a topping tower made of a steel pipe of 50 mm. in inner diameter and 3.5 m. in length (filled with McMahon packings) at a flow rate of 2 l./hr. in order to remove hydrocyanic acid. The tower was kept in the bottom within 76°–80° C. by heating with steam coils. The temperature of the tower at the top was 25° C. The specific gravity of the hydrocyanic acid distilled off from the top was 0.720 at 0° C. which is closed to the value of 0.718 disclosed in the literature. One tenth of a percent of potassium iodide was added as a stabilizer to the solution at the topping tower. Eighty four percent of the hydrocyanic acid originally present in the solution fed to the topping tower was recovered by this treatment. The rest of the hydrocyanic acid was contained in the bottom solution of the topping tower which consisted of crude methacrylonitrile. The loss of methacrylonitrile in the above treatment was 0.5 percent. The purity of the crude methacrylonitrile was 87.5 percent, other components of the crude methacrylontrile were 2.1 percent of methacrolein, 1.8 percent of hydrocyanic acid, 5.1 percent of acetonitrile and 2.8 percent of water, and the rest (0.7 percent) was high boiling substances; all percent being by weight.

Acetonitrile in the water layer was nearly equal to that in the organic layer, and its total recovery was 98 percent. On the contrary, methacrolein was scarcely found in the water layer, and its total recovery was only 60 percent. This is probably due to the loss by the hydration in water, by which methacrolein is converted into hydromethacrolein, or to the loss by polymerization during the distillation.

*Example 56.—Purification of crude methacrylonitrile*

The purification was carried out in batch-system employing a distillation column made of glass of 15 mm. in inner diameter and 1.5 m. in height, filled with Fenske packing, and having 48 theoretical plates. Five hundred cubic centimeter of the crude methacrylonitrile obtained in Example 55 was charged into a three-necked flask, which was the bottom of the column, and was heated to 90°–95° C. The reflux ratio was kept at 4–5. A tenth of a percent of hydroquinone was added as a stabilizer. After removing low boiling distillates having boiling points lower than 62° C. (hydrocyanic acid and an azeotrope of methacrolein and water), the column was kept at 75°–78° C. at the top, whereby a mixture comprising an azeotrope of methacrylonitrile and water, and an azeotrope of acetonitrile and water was distilled. By this treatment the water contained in the crude methacrylonitrile was substantially removed. Then acetonitrile was distilled at 82° C. (at the top of the column).

As said azeotropic mixture forms two layers, the water content in the mixture can be substantially removed by repeating the operations of returning the water layer back to the stripping tower and treating the organic layer as described above. In such ways acetonitrile and methacrylonitrile can be separated completely.

The purity of the methacrylonitrile thus obtained was 99.52 percent. Impurities contained were 0.3 percent of water, 0.05 percent of methacrolein, 0.02 percent of hydrocyanic acid, 0.04 percent of acetonitrile and 0.01 percent of other substances.

By making a balance sheet of methacrylonitrile in the distillation of this example from the results of analysis, it was found that purified methacrylonitrile can be obtained in a yield of 94–95 percent from crude methacrylonitrile.

*Example 57.—Preparation of methyl methacrylate from crude methacrylonitrile*

Into a four necked 1 l. flask provided with a reflux condenser, 230 g. of $H_2SO_4$ (85%) and 2.5 g. of $CuSO_4 5H_2O$ were charged. An amount of 76.6 g. of the crude methacrylonitrile obtained in Example 55 was added drop-wise to the resulting mixture for 40 minutes, while maintaining the temperature at 95°–100° C. under constant stirring. The mixture was refluxed at the same temperature for additional 40 minutes. Analysis showed the conversion to methacrylamide of 97 percent.

Sixty four g. of methanol and 3 g. of hydroquinone were added to the flask and the content was refluxed for 1 and a half hr. at 90°–100° C. Then the reflux condenser was replaced with a packed column, filled with McMahon packings and having a zone length of 20 cm., and steam-distillation was effected by blowing steam into the flask. In this case, the distillation of methylmethacrylate was carried out during 1 and a half hour so that methacrylic acid might not be distilled until the major part of the ester was distilled. Thereafter, the distillation was further continued until no more oily matter was distilled.

The distillate caught was composed of 88 g. of methyl methacrylate, 3.9 g. of methacrylic acid, 33 g. of methanol, and small quantities of water, hydrocyanic acid, methyl formate and ether. After adding water and stirring the distillate was allowed to stand to form two layers. The ester layer was distilled under reduced pressure to obtain 85 g. of methyl methacrylate of 99 percent purity. The yield based on the amount of methacrylonitrile was 84 percent. Two g. of methyl methacrylate was found in the water layer.

*Example 58.—Preparation of methyl methacrylate from crude methacrylonitrile*

After amidation had been carried out as in Example 57 the following operations were conducted:

In place of adding 64 g. of methanol at one time, 48 g. was first added to the content of the flask. After steam distilling the greater part of the methacrylate fraction, the steam was once interrupted before methacrylic acid was distilled. (The temperature of the distillate was at below 75° C.) Then the rest of the methanol (16 g.) was added, and the steam distillation was continued again. The content of methacrylic acid was reduced to 0.5 percent by the above treatment. The distillate was then treated as in Example 57, and distilled under reduced pressure to obtain 89 g. of methyl methacrylate of 99 percent purity. The yield based on the amount of methacrylonitrile was 88 percent.

Further, on repeating the above treatment with methanol of 90 percent strength, 92 g. of methyl methacrylate of 99 percent purity was obtained. The yield based on the amount of methacrylonitrile was 91 percent.

*Example 59.—Preparation of methyl methacrylate from purified methacrylonitrile*

The process of Example 58 was repeated except that 67.4 g. of the purified methacrylonitrile obtained in Example 56 was used. Water containing methanol of 90 percent strength was employed, and 94.3 g. of methyl methacrylate of 99.3 percent purity was obtained. The yield based on the amount of methacrylonitrile was 93.6 percent.

*Example 60.—Preparation of ethyl methacrylate from purified methacrylonitrile*

The esterification was carried out as in Example 59 except that 102 g. of ethanol (90%) and a reflux temperature of 110°–115° C. were employed. One hundred and four g. of ethyl methacrylate of 99 percent purity was obtained. The yield based on the amount of methacrylonitrile was 90.3 percent.

The nature of the present invention has been illustrated by the desirable examples of the method, but it should be noted that the present invention is not restricted to the examples and that further variations of the method are possible without deviating from the scope of the invention.

What we claim is:

1. A process for the production of methacrylonitrile by a single-step reaction from isobutylene which comprises contacting a mixture of isobutylene, molecular oxygen, and ammonia in the vapor phase at a temperature of about 400° C. to 500° C. with a catalyst which is an oxide of the element components in atomic ratios expressed by the empirical formula:

$$P_nSb_aMo_bBi_cO_d$$

where
$n=0-12$
$a=0.5-20$
$b=1-18$
$c=0.5-11$, $c \leq 4.4+b$,
$a+b+c=22$, and
$d=5/2n+5/2a+3b+3/2c$.

2. A process as defined in claim 1 wherein $a \leq 11$ and $2 \geq n \geq 0.5$.
3. A process as defined in claim 1 wherein said catalyst is kept fluidized.
4. A process defined in claim 1 wherein said catalyst is supported on carrier material which consists essentially of silica.
5. A process as defined in claim 1 wherein said catalyst is in admixture with inert solid packing selected from the group consisting of porcelain packing and metallic packing.
6. A process as defined in claim 1 wherein air is used as a source of molecular oxygen.
7. A process for the production of methacrylonitrile by a single-step reaction from isobutylene which comprises contacting a mixture of isobutylene, molecular oxygen, and ammonia in the vapor phase at a temperature of about 400° C. to 500° C. with a catalyst which is an oxide of the element components in atomic ratios expressed by the empirical formula:

$$P_nSb_aMo_bBi_cO_d$$

where
$n=0-12$
$a=2.3-8.9$
$b=6.2-12.8$
$c=6.9-7.9$
$a+b+c=22$, and
$d=5/2n+5/2a+3b+3/2c$.

8. A process for the production of methacrylonitrile by a single-step reaction from isobutylene which comprises contacting a mixture of isobutylene, molecular oxygen, and ammonia in the vapor phase at a temperature of about 400° C. to 500° C. with a catalyst which is an oxide of the element components in atomic ratios expressed by the empirical formula:

$$P_nSb_aMo_bBi_cO_d$$

where
$n=0.5-1.5$
$a=0.5-20$
$b=1-18$
$c=0.5-11$ and $c \leq 4.4+b$,
$a+b+c=22$, and
$d=5/2n+5/2a+3b+3/2c$.

9. A process for the production of methacrylonitrile by a single-step reaction from isobutylene which comprises contacting a mixture of isobutylene, molecular oxygen, and ammonia in the vapor phase at a temperature of about 400° C. to 500° C. with a catalyst which is an oxide of the element components in atomic ratios expressed by an empirical formula selected from the group which consists of $$Bi_9As_{1.5}Mo_{12}O_{52}$$
$$Bi_9PSb_2Mo_{12}O_{55}$$
$$Bi_9PMo_{12}CaO_{53}, \text{ and}$$
$$Bi_9As_{1.5}Mo_{12}Na_2O_{53}$$

10. A method for the production of methacrylonitrile which comprises admixing isobutylene, ammonia and air, contacting said mixture at a temperature of about 400° C. to 500° C. with a catalyst which is an oxide of the element components in atomic ratios expressed by the empirical formula:

$$P_nSb_aMo_bBi_cO_d$$

where
$n=0-12$
$a=0.5-20$
$b=1-18$
$c=0.5-11$ and $c \leq 4.4+b$
$a+b+c=22$
$d=5/2n+5/2a+3b+3/2c$ and introducing additional air into said mixture while said mixture is in contact with said catalyst.

References Cited

UNITED STATES PATENTS

| | | | |
|---|---|---|---|
| 2,714,119 | 7/1955 | Crounse | 260—561 |
| 2,743,297 | 4/1956 | Husted et al. | 260—561 |
| 2,850,463 | 9/1958 | Romanovsky et al. | 252—437 |
| 2,904,580 | 9/1959 | Idol | 260—465.3 |
| 2,967,156 | 1/1961 | Talvenheimo | 252—437 |
| 3,009,943 | 11/1961 | Hadley et al. | 260—465.3 |
| 3,065,260 | 11/1962 | Konz et al. | 260—486 |
| 3,075,001 | 1/1963 | Godfrey | 260—486 |
| 3,075,002 | 1/1963 | Sedlak | 260—486 |
| 3,086,041 | 4/1963 | Hadley et al. | 260—465.3 |
| 3,135,783 | 6/1964 | Sennewald et al. | 260—465.3 |
| 3,135,804 | 6/1964 | Grasselli et al. | 252—437 X |
| 3,141,034 | 7/1964 | Krebaum | 260—465.3 |
| 3,142,697 | 7/1964 | Jennings et al. | 260—465.3 |
| 3,152,170 | 10/1964 | Barclay et al. | 260—465.3 |
| 3,153,085 | 10/1964 | Hadley | 260—465.3 |
| 3,153,665 | 10/1964 | Roelen et al. | 260—465.3 |
| 3,157,688 | 11/1964 | Arnold et al. | 260—465.3 |
| 3,164,627 | 1/1965 | Minekawa et al. | 260—465.3 |
| 3,196,178 | 7/1965 | Kelley et al. | 260—561 |

JOSEPH P. BRUST, *Primary Examiner.*

CHARLES B. PARKER, *Examiner.*

UNITED STATES PATENT OFFICE
CERTIFICATE OF CORRECTION

Patent No. 3,346,617                      October 10, 1967

Kenzo Hiroki et al.

It is hereby certified that error appears in the above numbered patent requiring correction and that the said Letters Patent should read as corrected below.

In the heading to the printed specification, line 4, for "Tashichika Shizume" read -- Toshichika Shizume --; lines 5 and 6, for "Tokachika Yoshino" read -- Takachika Yoshino --.

Signed and sealed this 4th day of February 1969.

(SEAL)
Attest:

Edward M. Fletcher, Jr.                      EDWARD J. BRENNER
Attesting Officer                           Commissioner of Patents